United States Patent
Kwon et al.

(10) Patent No.: US 11,619,413 B2
(45) Date of Patent: Apr. 4, 2023

(54) INTELLIGENT AIR CLEANER, INDOOR AIR QUALITY CONTROL METHOD AND CONTROL APPARATUS USING INTELLIGENT AIR CLEANER

(71) Applicant: LG ELECTRONICS INC., Seoul (KR)

(72) Inventors: Youngtag Kwon, Seoul (KR); Sangyun Kim, Seoul (KR); Hongwon Lee, Seoul (KR); Daesung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 16/499,056

(22) PCT Filed: Jul. 12, 2019

(86) PCT No.: PCT/KR2019/008679
§ 371 (c)(1),
(2) Date: Sep. 27, 2019

(87) PCT Pub. No.: WO2021/010505
PCT Pub. Date: Jan. 21, 2021

(65) Prior Publication Data
US 2021/0356158 A1    Nov. 18, 2021

(51) Int. Cl.
*F24F 11/63* (2018.01)
*F24F 11/526* (2018.01)
(Continued)

(52) U.S. Cl.
CPC ......... *F24F 11/63* (2018.01); *F24F 11/0001* (2013.01); *F24F 11/526* (2018.01); *G06N 3/08* (2013.01); *F24F 2110/65* (2018.01)

(58) Field of Classification Search
CPC ............... F24F 11/526; F24F 11/0001; F24F 2011/0002; F24F 11/72; G06N 3/08; G06N 20/00
See application file for complete search history.

(56) References Cited

U.S. PATENT DOCUMENTS

| 2016/0356519 | A1* | 12/2016 | Choi | ........................ F24F 11/30 |
| 2017/0154517 | A1* | 6/2017 | Aliakseyeu | ............. H04W 4/02 |
| 2019/0056138 | A1* | 2/2019 | Lee | ..................... G06F 16/9038 |

FOREIGN PATENT DOCUMENTS

| JP | 2006-292209 A | 10/2006 |
| KR | 10-1591735 B1 | 2/2016 |

(Continued)

*Primary Examiner* — Lionel Nouketcha
(74) *Attorney, Agent, or Firm* — Birch, Stewart, Kolasch & Birch, LLP

(57) ABSTRACT

An indoor air quality control method using an intelligent air cleaner is disclosed. An indoor air quality control method using an intelligent air cleaner according to an embodiment of the present invention can predict indoor dust concentration progress on the basis of output values of a learning model having received dust concentration data as input values when the dust concentration data of an indoor place where the air cleaner is located is received from the air cleaner, and determine whether ventilation is required by comparing the predicted progress with outside dust concentration data received from the Meteorological Administration server. Accordingly, indoor dust concentration changes can be predicted and an appropriate ventilation time can be recommended. The intelligent air cleaner and the indoor air quality control method using the same of the present invention can be associated with artificial intelligence modules, devices related with the 5G service, and the like.

16 Claims, 15 Drawing Sheets

(51) Int. Cl.
 *F24F 11/00* (2018.01)
 *G06N 3/08* (2023.01)
 *F24F 110/65* (2018.01)

(56) References Cited

FOREIGN PATENT DOCUMENTS

KR 10-2016-0150364 A 12/2016
KR 10-1866861 B1 6/2018
KR 10-2019-0036574 A 4/2019

\* cited by examiner

[Figure 1]
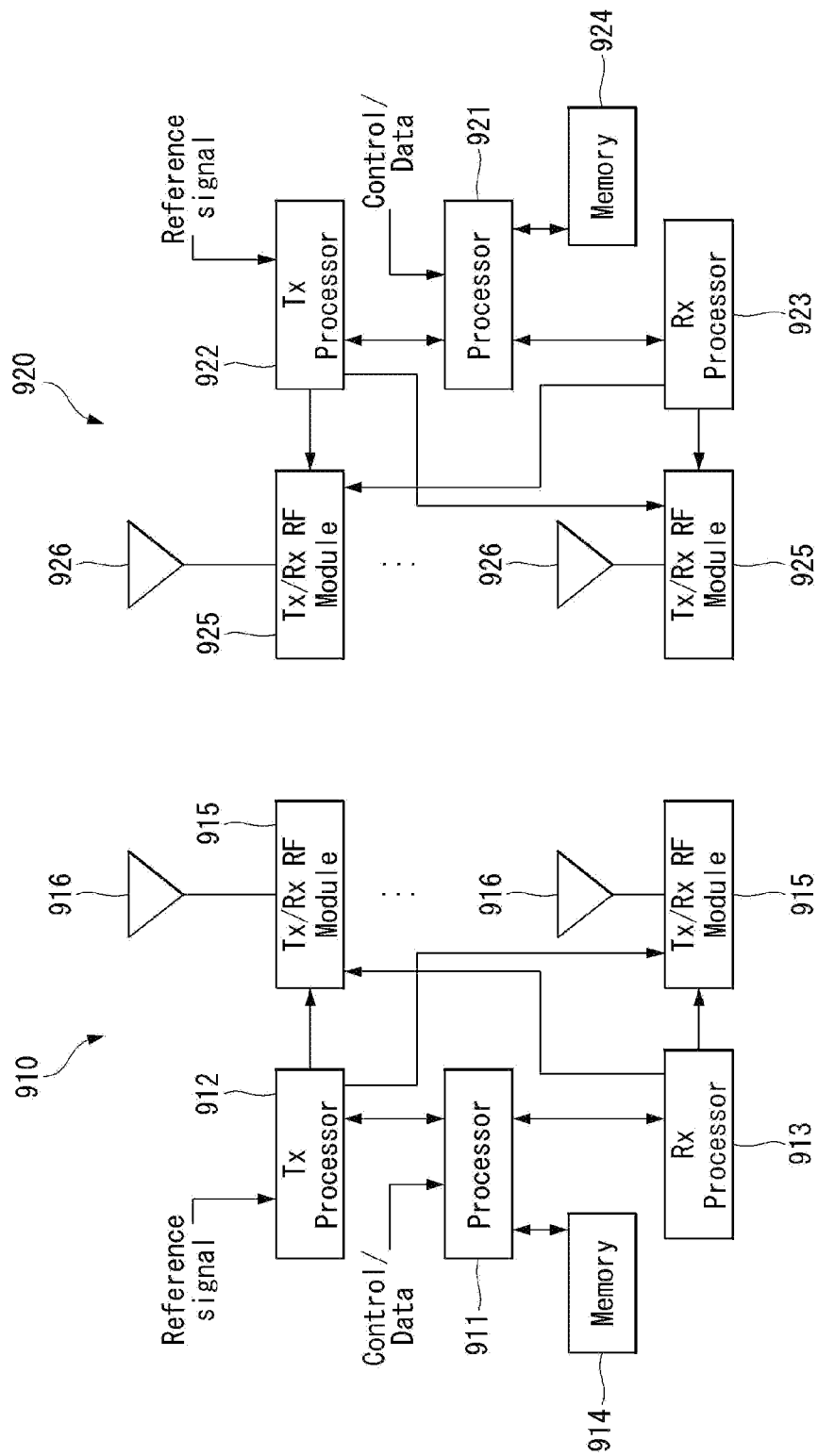

[Figure 2]
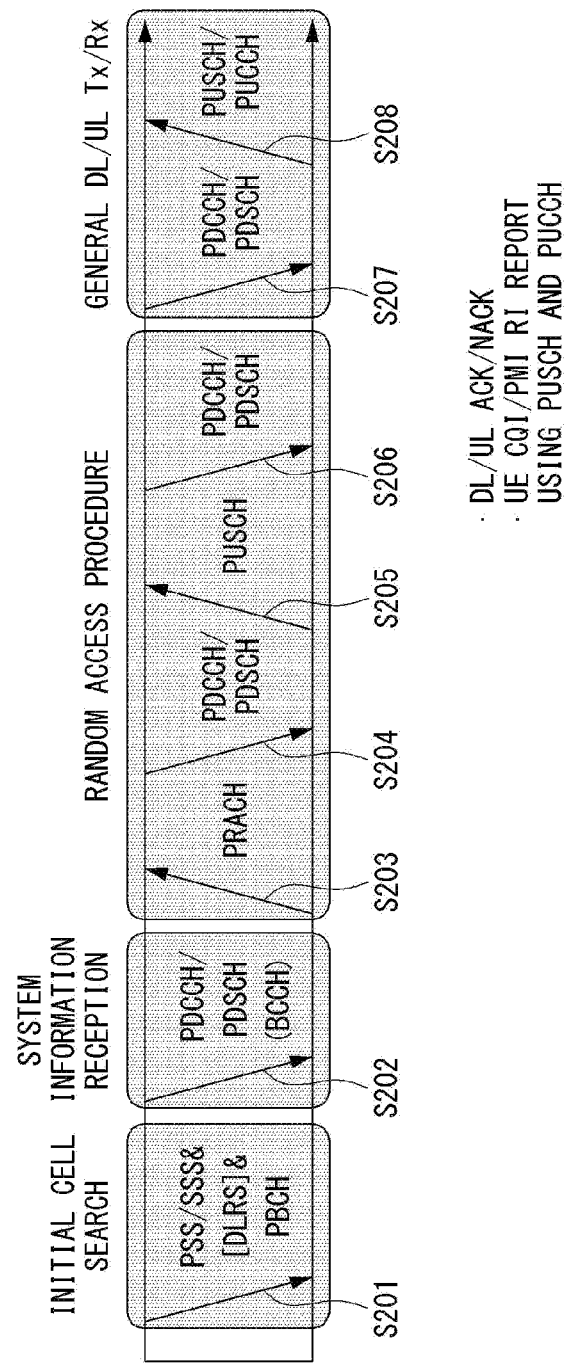

[Figure 3]
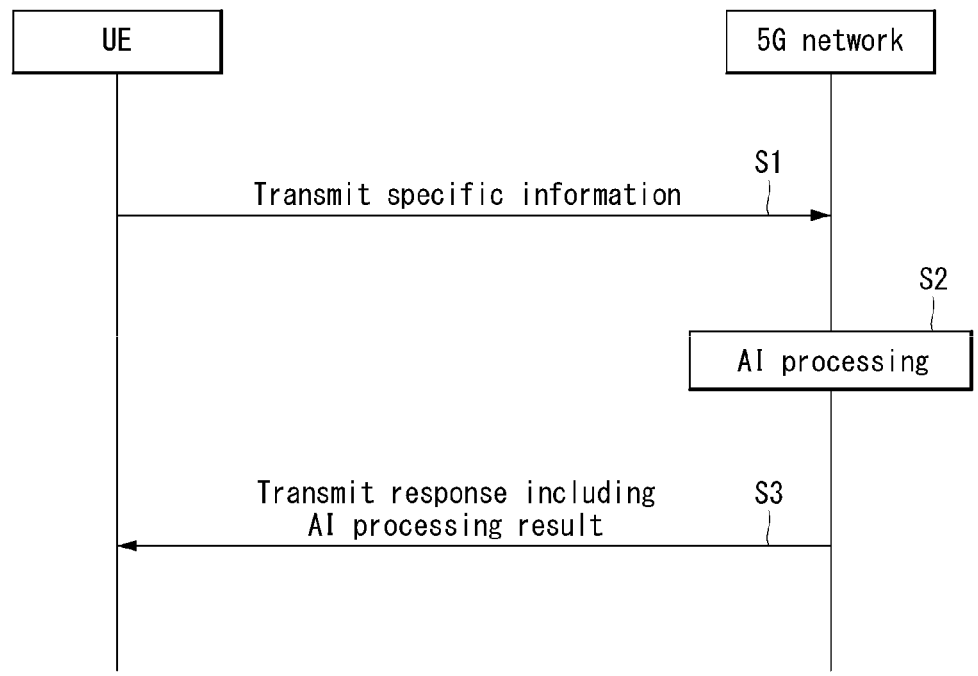

[Figure 4]
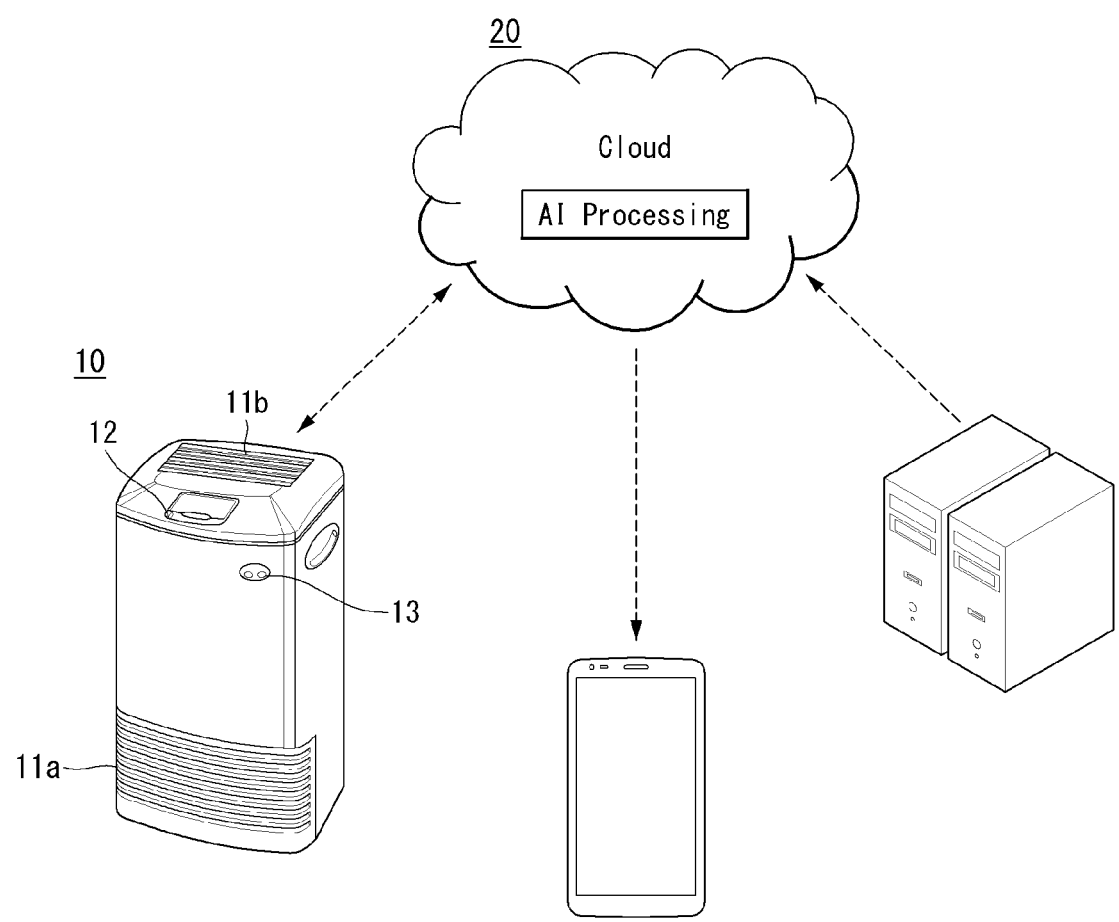

[Figure 5]
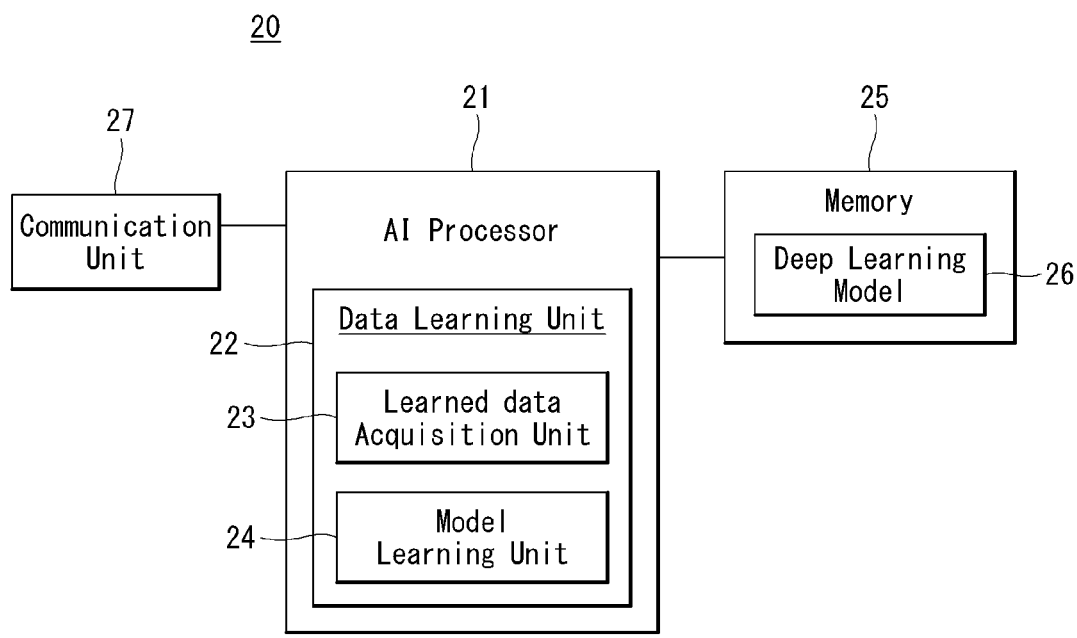

【Figure 6】
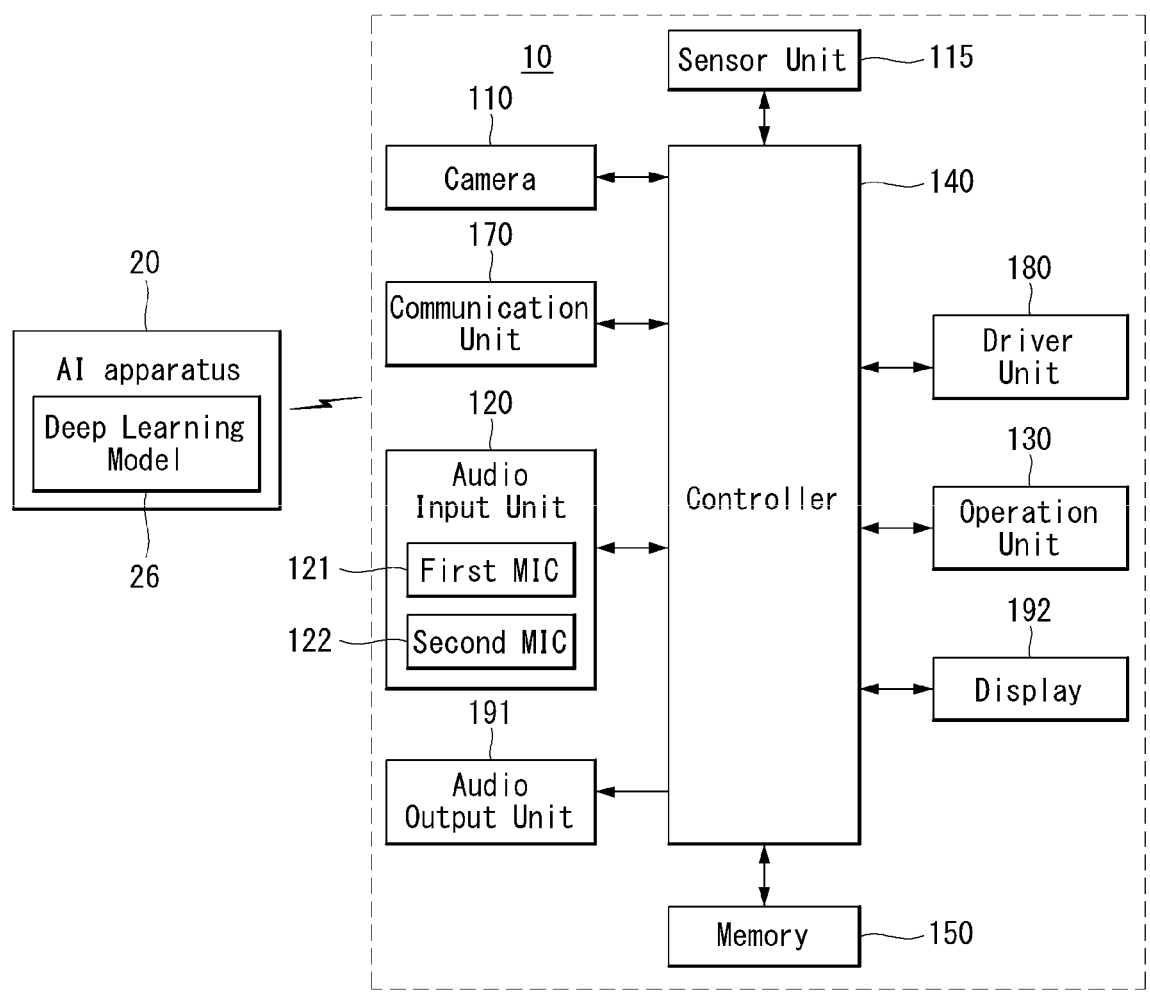

[Figure 7]
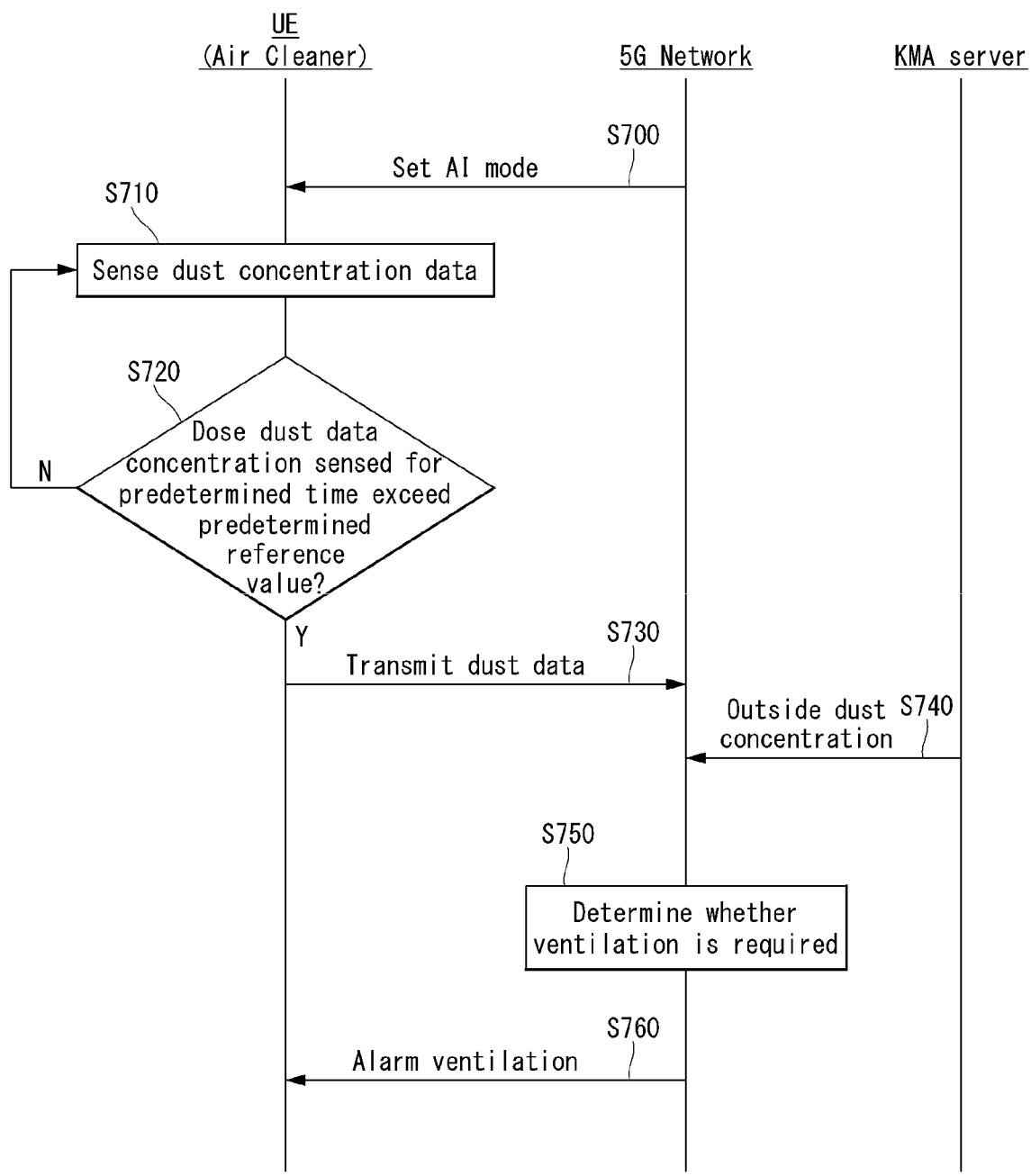

[Figure 8]
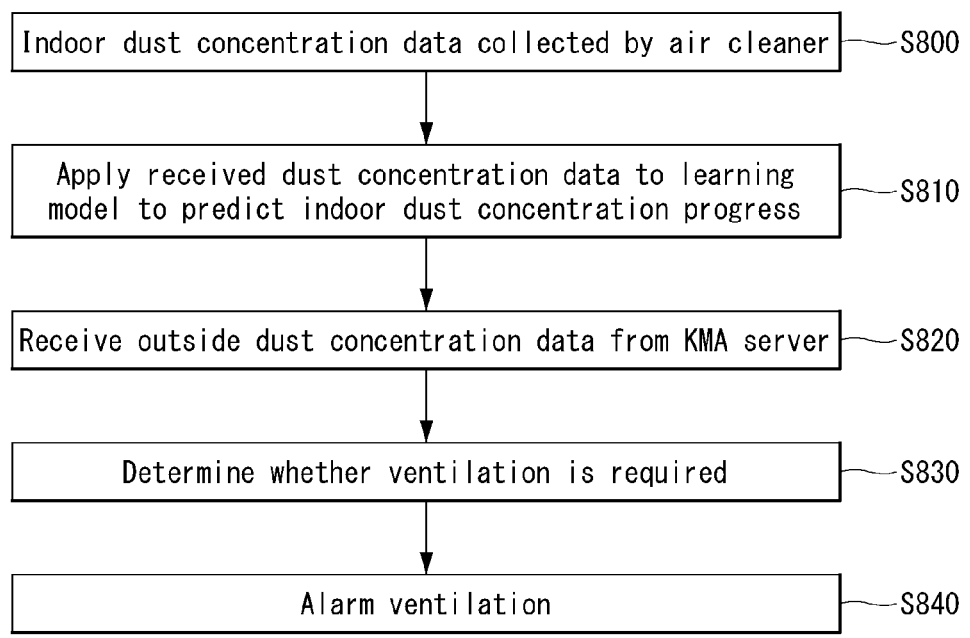

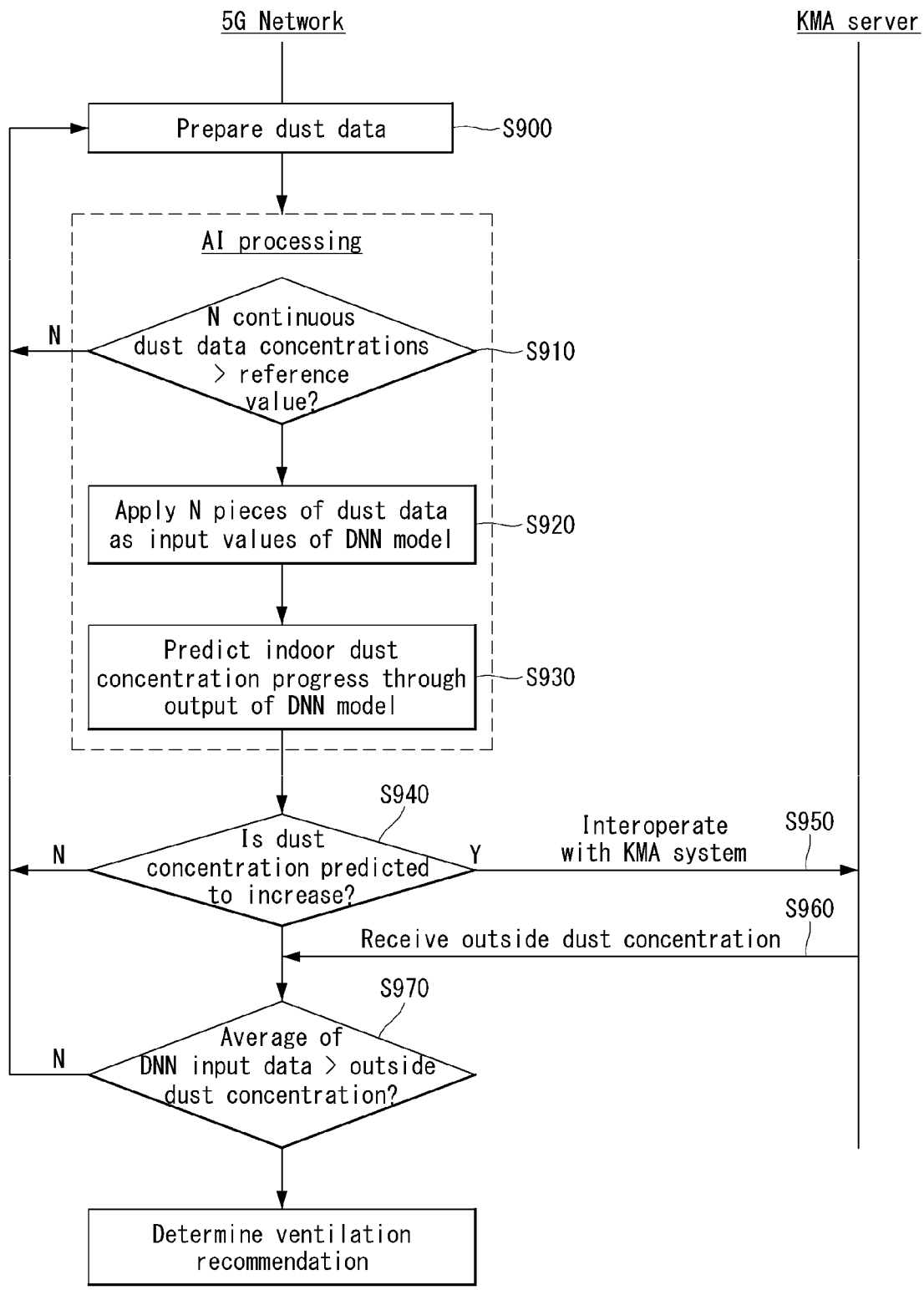
[Figure 9]

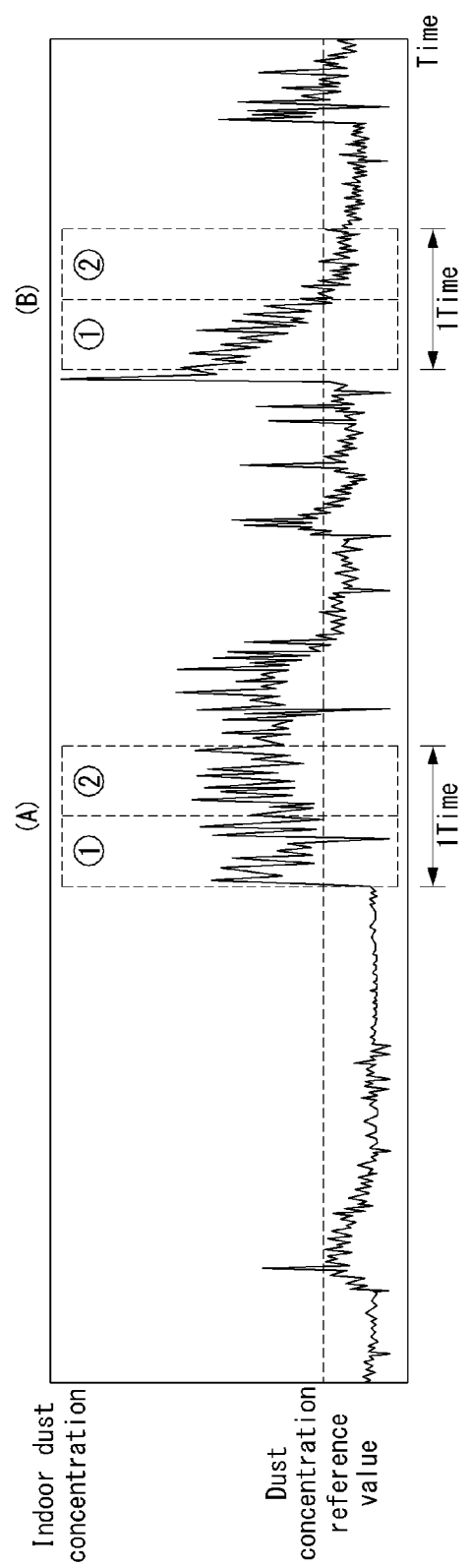
[Figure 10]

[Figure 11]
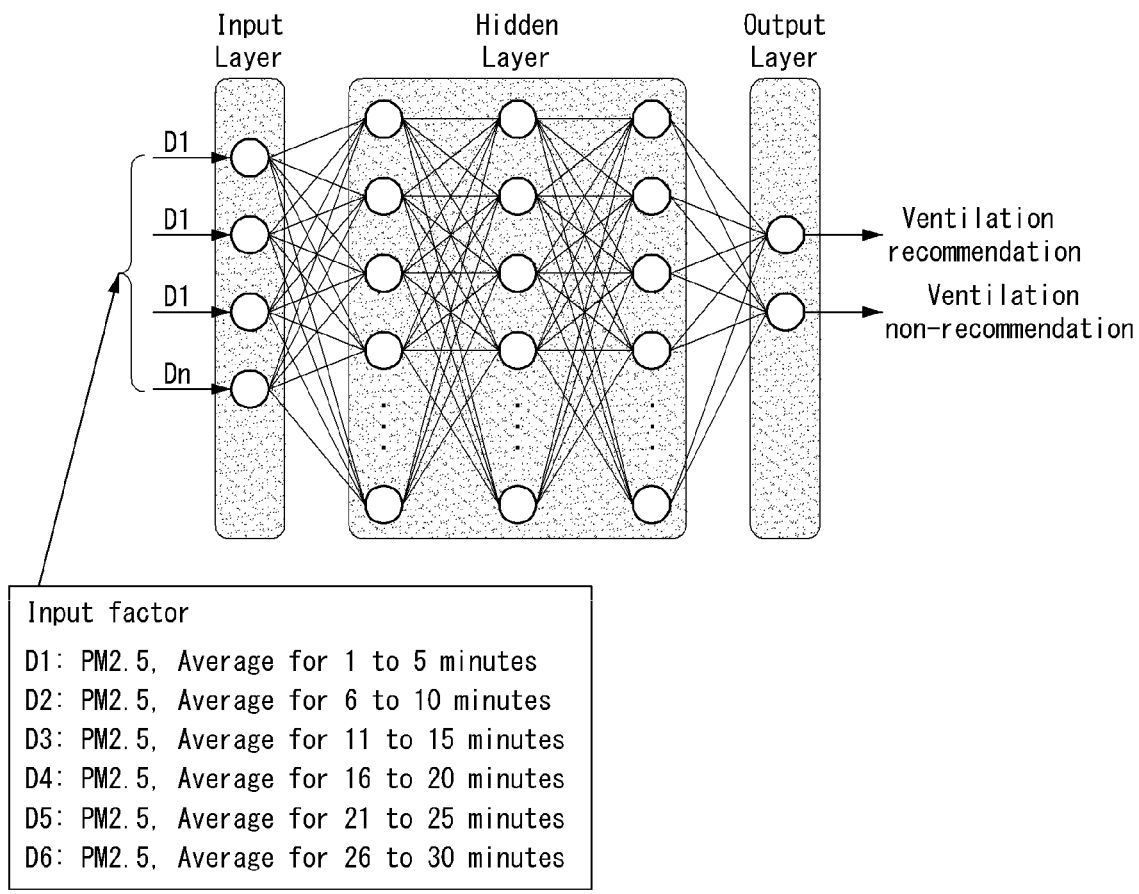

[Figure 12]
Ventilation non-recommendation
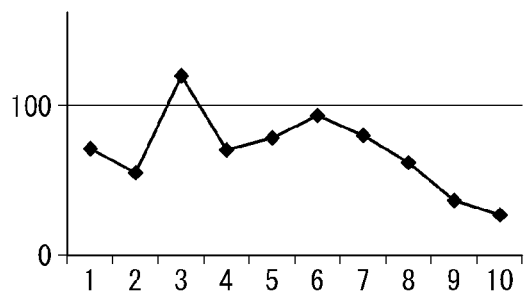
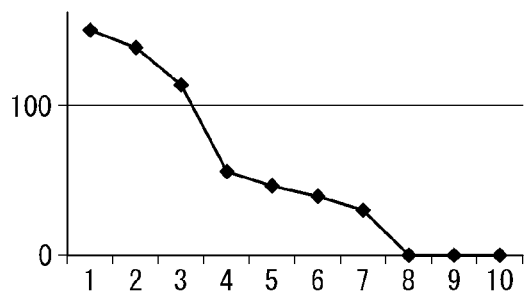
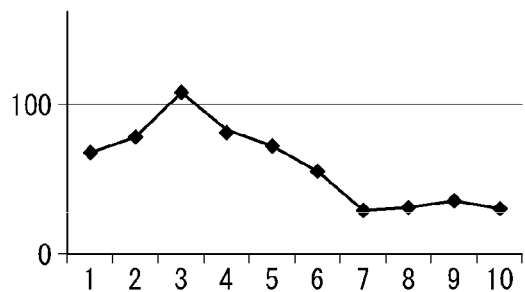
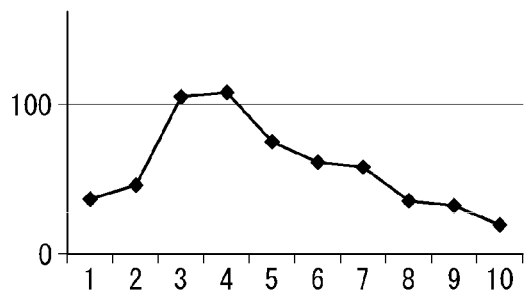
Ventilation recommendation
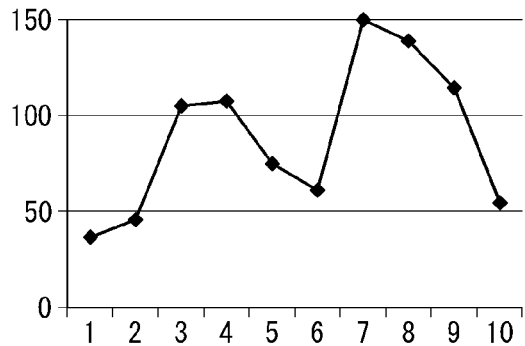
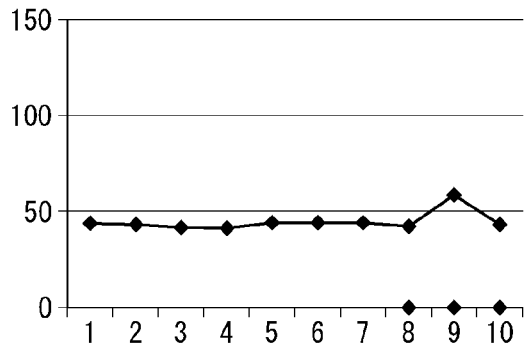
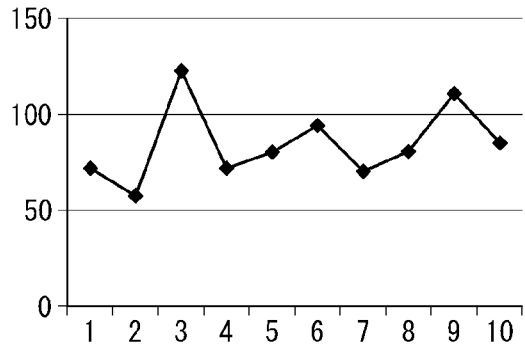
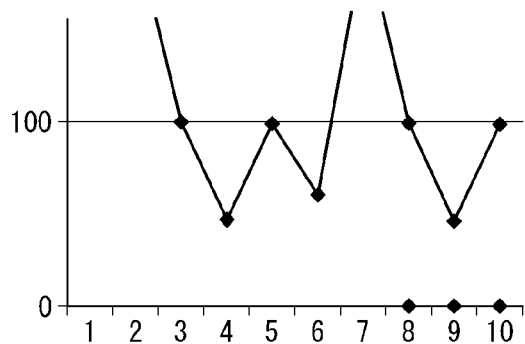

[Figure 13]
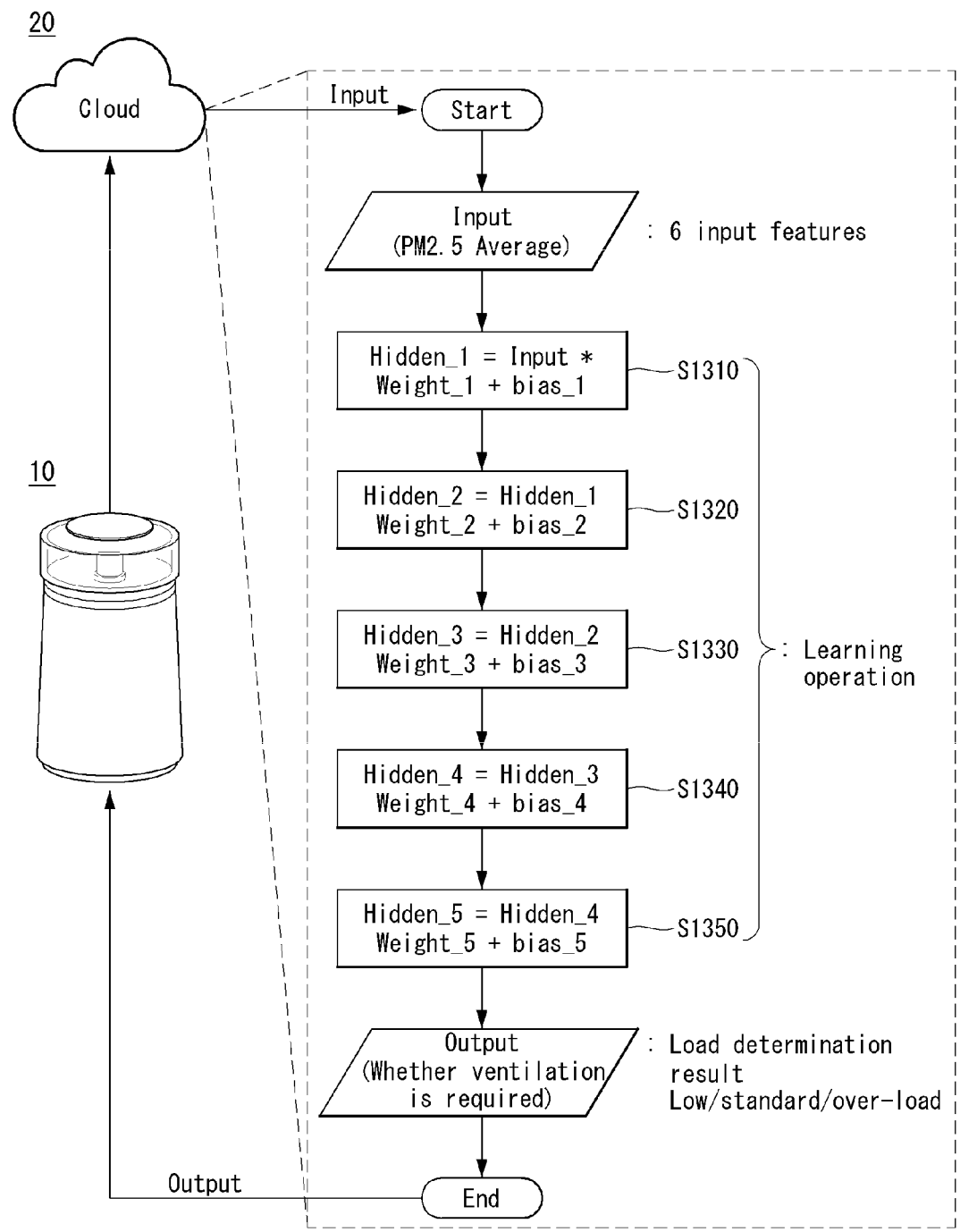

[Figure 14]

[First test DB & DNN network performance evaluation]

- Conditions
  : Performance evaluation per prediction time
  : Accuracy is average over five times

| | 30-minute prediction/50-minute ventilation recommendation | 30-minute prediction/60-minute ventilation recommendation |
|---|---|---|
| Accuracy | 78.4% | 71.3% |
| Train (Recommendation: non-recommendation) | 2979 : 2089 | 2571 : 2606 |
| Test (Recommendation: non-recommendation) | 1293 : 1308 | 1079 : 1140 |
| 비고 | · Reference time (25 minutes)<br>Number of abnormalities : 8669<br>Reference per day: 0.97 times<br>Ratio (recommendation/non-recommendation):4272:4397<br>· Recommendation on daily basis: 0.48 times | · Reference time (30 minutes)<br>Number of abnormalities : 7396<br>Reference per day: 0.82 times<br>Ratio (recommendation/non-recommendation):3650:3746<br>· Recommendation on daily basis: 0.41 times |

【Figure 15】

[Second test DB & DNN network performance evaluation]

- Conditions
  : 30-minute prediction/50-minute ventilation recommendation
  : Train and test DB are randomly selected from
    all DBs and learning and accuracy are measured

|  | DB #1 | DB #2 | DB #3 | DB #4 | DB #5 |
|---|---|---|---|---|---|
| Accuracy | 80.33% | 81.23% | 79.72% | 82.19% | 80.73% |
| Train Recommendation: non-recommendation | 6517:2092 | 6424:1858 | 6420:1862 | 6450:1832 | 6391:1891 |
| Test Recommendation: non-recommendation | 2775:914 | 2760:789 | 2764:785 | 2734:815 | 2793:756 |
| Note | Recommend ventilation at a rate of 75.6% in ventilation recommendation inquiry | | | | |

INTELLIGENT AIR CLEANER, INDOOR AIR QUALITY CONTROL METHOD AND CONTROL APPARATUS USING INTELLIGENT AIR CLEANER

CROSS-REFERENCE TO RELATED APPLICATIONS

This application is the National Phase of PCT International Application No. PCT/KR2019/008679, filed on Jul. 12, 2019, which is hereby expressly incorporated by reference into the present application.

Technical Field

The present invention relates to an intelligent air cleaner, an indoor air quality control method and control apparatus using the intelligent air cleaner, and more specifically, to an intelligent air cleaner capable of recommending an appropriate ventilation time by predicting indoor dust concentration progress, and an indoor air quality control method and control apparatus using the intelligent air cleaner.

Background Art

An air cleaner has a function of eliminating fine dusts or harmful substances in the air and purifying the air. Such an air cleaner is required to minimize energy consumption and effectively control pollutants in the air.

Meanwhile, in cases in which a degree of pollution is very high, such as cooking and cleaning for a long time in indoor spaces, ventilation may be a more efficient method rather than operating an air cleaner indoors.

Furthermore, considering that the lifespan of a filter may be considerably affected when an air cleaner is continuously driven in order to eliminate indoor fine dusts, it is necessary to actively reflect a state of outside air quality in air purification.

DISCLOSURE

Technical Problem

An object of the present invention is to solve the aforementioned necessity and/or problems.

Further, the present invention provides an indoor air quality control method using an intelligent air cleaner which can recommend an appropriate ventilation time by predicting indoor dust concentration progress.

Further, the present invention provides an indoor air quality control method using an intelligent air cleaner which can recommend an appropriate ventilation time by comparing a predicted indoor dust concentration with a degree of outside air pollution.

Further, the present invention provides an indoor air quality control method using an intelligent air cleaner which can minimize the amount of input data using a deep learning model and efficiently manage the lifespan of a filter of the air cleaner by predicting indoor dust concentration progress on the basis of the minimized amount of input data and recommending ventilation instead of air purification using the air cleaner.

Further, the present invention provides an indoor air quality control method using an intelligent air cleaner which can efficiently manage the air cleaner by comparing indoor dust concentration progress with a real-time outside fine dust concentration and providing a ventilation alarm to the air cleaner or a user terminal.

Technical Solution

An indoor air quality control method using an intelligent air cleaner according to one aspect of the present invention includes: receiving, from the air cleaner, dust concentration data of an indoor place where the air cleaner is located; predicting indoor dust concentration progress on the basis of output values of a learning model having the received dust concentration data as input values; receiving outside dust concentration data from an external server; determining whether ventilation is required by comparing the predicted indoor dust concentration progress with the outside dust concentration data; and controlling an alarm to be output to the air cleaner or a mobile terminal associated with the air cleaner according to whether ventilation is required, wherein the received dust concentration data is data exceeding a predetermined reference value among data sensed at predetermined intervals.

The receiving of the indoor dust concentration data from the air cleaner may include receiving a certain percentage or higher of data in a bad state on the basis of PM 2.5 forecast from among data sensed by the air cleaner at predetermined intervals.

The predicting of the indoor dust concentration progress may include: determining whether dust concentration data continuously sensed N times exceeds the predetermined reference value; and defining data of N dust concentrations as input values of a deep learning model and predicting the indoor dust concentration progress through output values of the deep learning model.

The indoor air quality control method may further include, when progress of additional N dust concentrations sensed after the N dust concentrations are sensed is predicted to increase as a result of prediction of the indoor dust concentration progress: requesting the outside dust concentration data from the Meteorological Administration server; and determining that ventilation is required when an average value of input data of the deep learning model is greater than the outside dust concentration data received from the Meteorological Administration server.

The indoor dust concentration progress may be predicted as one of a pattern in which the same number of dust concentrations as the number of pieces of dust concentration data received from the intelligent air cleaner increase, a pattern in which the dust concentrations decrease and a pattern in which the dust concentrations remains in a current state.

The determining of whether ventilation is required may include determining that ventilation is required when the indoor dust concentration progress is determined to be the increasing pattern or the current state remaining pattern.

The determining of whether ventilation is required may include: determining that ventilation is not required when the indoor dust concentration progress is predicted as the increasing pattern and an outside dust concentration received from the external server is higher than the indoor dust concentration; and controlling the air cleaner to continuously operate.

The determining of whether ventilation is required may further include predicting a ventilation time, wherein it is determined that ventilation is required when the indoor dust concentration progress is predicted as the decreasing pattern and it is predicted that the outside dust concentration is lower than the indoor dust concentration at a specific time of the decreasing pattern.

The controlling of output of the alarm includes controlling an indoor dust concentration state and whether ventilation is required to be output through audio.

The receiving of the indoor dust concentration data may further include receiving, in a state in which the air cleaner is powered off, the indoor dust concentration data sensed through a sensing unit in a state in which the air cleaner is in a standby state, and the indoor air quality control method may further include controlling the air controller to be activated when it is determined that ventilation is required.

The determining of whether ventilation is required may include adaptively controlling a ventilation recommendation standard in consideration of characteristics of an occupant residing in the indoor place.

An indoor air quality control apparatus using an intelligent air cleaner according to another aspect of the present invention includes: an RF communication unit a storage unit storing a deep learning model; and a processor configured to determine whether to perform ventilation in a space in which the air cleaner is located on the basis of indoor dust concentration data received from the air cleaner and outside dust concentration data received from the Meteorological Administration server, wherein the received dust concentration data is data exceeding a predetermined reference value among data sensed at predetermined intervals, and the processor predicts indoor dust concentration progress on the basis of output values of the deep learning model having the received dust concentration data as input values and controls an alarm to be output to the air cleaner or a mobile terminal associated with the air cleaner according to whether ventilation is required.

An indoor air quality control system according to another aspect of the present invention includes: an intelligence air cleaner for acquiring indoor dust concentration data; and a cloud server for receiving the indoor dust concentration data from the air cleaner, wherein the received dust concentration data is data exceeding a predetermined reference value among data sensed by the air cleaner at predetermined intervals, and the cloud server predicts indoor dust concentration progress on the basis of output values of a deep learning model having the received dust concentration data as input values, receives outside dust concentration data from an external server, determines whether ventilation is required by comparing the predicted indoor dust concentration progress with the outside dust concentration data, and outputs an alarm to the air cleaner or a mobile terminal associated with the air cleaner according to whether ventilation is required.

A non-transitory computer-readable medium according to another aspect of the present invention stores a computer-executable component configured to be executed in one or more processors of a computer device, wherein the computer-executable component is configured: to receive, from an air cleaner, dust concentration data of an indoor place where the air cleaner is located; to predict indoor dust concentration progress on the basis of output values of a learning model having the received dust concentration data as input values; to receive outside dust concentration data from an external server; to determine whether ventilation is required by comparing the predicted indoor dust concentration progress with the outside dust concentration data; and to control an alarm to be output to the air cleaner or a mobile terminal associated with the air cleaner according to whether ventilation is required, wherein the received dust concentration data includes data exceeding a predetermined reference value among data sensed at predetermined intervals.

Advantageous Effects

The effects of the indoor air quality control method using an intelligent air cleaner according to an embodiment of the present invention will be described below.

According to the present invention, it is possible to recommend an appropriate ventilation time by predicting indoor dust concentration progress.

Further, according to the present invention, it is possible to recommend an appropriate ventilation time by comparing a predicted indoor dust concentration with a degree of outside air pollution.

Further, according to the present invention, it is possible to minimize the amount of input data using a deep learning model and efficiently manage the lifespan of a filter of the air cleaner by predicting indoor dust concentration progress on the basis of the minimized amount of input data and recommending ventilation instead of air purification using the air cleaner.

Further, according to the present invention, it is possible to efficiently manage the air cleaner by comparing indoor dust concentration progress with a real-time outside fine dust concentration and providing a ventilation alarm to the air cleaner or a user terminal.

It will be appreciated by persons skilled in the art that the effects that could be achieved with the present invention are not limited to what has been particularly described hereinabove and the above and other effects that the present invention could achieve will be more clearly understood from the following detailed description.

DESCRIPTION OF DRAWINGS

Accompanying drawings included as a part of the detailed description for helping understand the present invention provide embodiments of the present invention and are provided to describe technical features of the present invention with the detailed description.

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of a user equipment and a 5G network in a 5G communication system.

FIG. 4 schematically illustrates a system for implementing an indoor air quality control method using an intelligent air cleaner according to an embodiment of the present invention.

FIG. 5 is a block diagram of an AI apparatus applicable to embodiments of the present invention.

FIG. 6 is an exemplary block diagram of an indoor air quality control apparatus using an intelligent air cleaner according to an embodiment of the present invention.

FIG. 7 illustrates a data flow for implementing the indoor air quality control method using an intelligent air cleaner according to an embodiment of the present invention.

FIG. 8 is a flowchart of the indoor air quality control method using an intelligent air cleaner according to an embodiment of the present invention.

FIG. 9 is a diagram for describing a detailed operation of a cloud server for performing the indoor air quality control method using an intelligent air cleaner according to an embodiment of the present invention.

FIG. 10 is a diagram for describing deep learning model learning standards according to an embodiment of the present invention.

FIG. 11 is a diagram for describing various examples of indoor air quality patterns used for deep learning model learning through data clustering according to an embodiment of the present invention.

FIG. 12 is a diagram for describing deep learning model learning patterns through input factors and result factors according to an embodiment of the present invention.

FIG. 13 is a diagram for describing an example of determining necessity for ventilation using a learned deep learning model according to an embodiment of the present invention.

FIGS. 14 and 15 are diagrams for describing results of tests to which the indoor air quality control method using an intelligent air cleaner according to the present invention is applied.

The accompanying drawings, which are included to provide a further understanding of the invention and are incorporated in and constitute a part of this specification, illustrate embodiments of the invention and together with the description serve to explain the principles of the invention.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

ABM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

FIG. 4 schematically illustrates a system in which an indoor air quality control method using an intelligent air cleaner according to an embodiment of the present invention is implemented.

Referring to FIG. 4, a system in which the indoor air quality control method using an intelligent air cleaner according to an embodiment of the present invention is implemented may include an intelligent air cleaner 10 and a cloud server 20.

The intelligent air cleaner 10 can transmit dust concentration data sensed in the intelligent air cleaner 10 to the cloud server 20 by performing data communication with the cloud server 20.

The cloud server 20 can perform AI processing on the basis of various types of indoor dust concentration data collected from the intelligent air cleaner 10. The cloud server 20 includes an AI system, an AI module and an AI apparatus for performing AI processing and each of the AI system, the AI module and the AI apparatus may include at least one learning model. The cloud server 20 can transmit AI processing results with respect to dust concentration data received from the intelligent air cleaner 10 to the intelligent air cleaner 10 or transmit a control signal of the intelligent air cleaner 10 according to AI processing results.

The Korea Meteorological Administration (KMA) server 30 may transmit location-based air pollution information to the cloud server 20. The location-based air pollution information may provide an observation point, an observation time, and a forecast (good, normal, bad, or very bad air quality). According to an embodiment of the present invention, when the KMA server provides location-based real-time observed air quality information to the cloud server 20, the cloud server 20 may provide a service of continuously driving the intelligent air cleaner 10, ending the operation of the air cleaner, recommending ventilation simultaneously with the operation of the air cleaner, or the like on the basis of dust concentration data collected through an indoor air cleaner and external air pollution level information of the point where the air cleaner is located.

Meanwhile, the cloud server 20 transmits the aforementioned ventilation recommendation service to a user terminal 40 such that the user can actively select whether or not to ventilate.

FIG. 5 is a block diagram of an AI apparatus applicable to embodiments of the present invention.

Referring to FIG. 5, an AI apparatus 20 may include an electronic device including an AI module which can perform AI processing, a server including the AI module, or the like. Further, the AI apparatus 20 may be included as at least a component of an air cleaner to perform at least part of AI processing.

AI processing can include all operations related to a controller 140 of an air cleaner. For example, the air cleaner can execute AI processing of air cleanliness or humidity information to perform processing/determination, control signal generation operations.

The AI apparatus 20 may be a client device that directly uses AI processing results or a device in a cloud environment which provides AI processing results to other devices. The AI apparatus 20 is a computing device capable of learning a neural network and may be implemented in various electronic devices such as a server, a desktop PC, a notebook PC, and a tablet PC.

The AI apparatus 20 may include an AI processor 21, a memory 25 and/or a communication unit 27.

The AI processor 21 may learn a neural network using a program stored in the memory 25. In particular, the AI processor 21 may learn a neural network for recognizing data related to the air cleaner. Here, the neural network for recognizing data related to the air cleaner may be designed to simulate the structure of the human brain on a computer and may include a plurality of network nodes having weights that simulate neurons of the human neural network. The plurality of network nodes may transmit and receive data according to a connection relationship to simulate neuron synaptic activity of transmitting and receiving signals through synapses. Here, the neural network may include a deep learning model developed from a neural network model. In the deep learning model, a plurality of network nodes may exchange data according to a convolution connection relationship while being located in different layers. Examples of neural network models include various deep learning techniques such as deep neural networks (DNNs), convolutional deep neural networks (CNNs), recurrent Boltzmann machines (RNNs), restricted Boltzmann machines (RBMs), deep belief networks (DBN), and deep Q-network, and may be applied to fields such as computer vision, speech recognition, natural language processing, and audio/signal processing.

Meanwhile, the processor performing the functions described above may be a general-purpose processor (e.g., CPU), or may be an AI-only processor (e.g., GPU) for artificial intelligence learning.

The memory 25 may store various programs and data necessary for the operation of the AI apparatus 20. The memory 25 may be implemented as a non-volatile memory, a volatile memory, a flash-memory, a hard disk drive (HDD), or a solid state drive (SDD). The memory 25 is accessed by the AI processor 21, and reading/writing/correction/deletion/updating of data by the AI processor 21 can be performed. In addition, the memory 25 may store a neural network model (e.g., a deep learning model 26) generated through a learning algorithm for data classification/recognition according to an embodiment of the present invention.

The AI processor 21 may include a data learning unit 22 that learns a neural network for data classification/recognition. The data learning unit 22 may learn criteria regarding which training data will be used to determine data classification/recognition and how to classify and recognize data using training data. The data learning unit 22 may acquire training data to be used for learning and learn the deep learning model by applying the acquired training data to the deep learning model.

The data learning unit 22 may be manufactured in the form of at least one hardware chip and mounted on the AI apparatus 20. For example, the data learning unit 22 may be manufactured in the form of a dedicated hardware chip for artificial intelligence (AI), or manufactured as a part of a general-purpose processor (CPU) or a graphics-only processor (GPU) and mounted on the AI apparatus 20. Further, the data learning unit 22 may be implemented as a software module. When the data learning unit 22 is implemented as a software module (or a program module including instructions), the software module may be stored in non-transitory computer readable media. In this case, at least one software module may be provided by an operating system (OS) or an application.

The data learning unit 22 may include a training data acquisition unit 23 and a model training unit 24.

The training data acquisition unit 23 may acquire training data required for a neural network model for classifying and recognizing data.

The model training unit 24 may train the neural network model such that it has a criterion for determining how to classify predetermined data using the acquired training data. In this case, the model training unit 24 may train the neural network model through supervised learning using at least some of training data as a criterion. Alternatively, the model training unit 24 may train the neural network model through unsupervised learning in which a criterion is discovered by self-learning using training data without supervision. In addition, the model training unit 24 may train the neural network model through reinforcement learning using feedback regarding whether results of determination of a situation according to learning are correct. Further, the model training unit 24 may train the neural network model using a learning algorithm including error back-propagation or gradient decent.

When the neural network model is trained, the model training unit 24 may store the trained neural network model in the memory. The model training unit 24 may store the trained neural network model in a memory of a server connected to the AI apparatus 20 through a wired or wireless network.

The data learning unit 22 may further include a training data preprocessing unit (not shown) and a training data selection unit (not shown) to improve analysis results of a recognition model or save resources or time necessary to generate the recognition model.

The training data preprocessing unit may preprocess acquired data such that the acquired data can be used for learning for situation determination. For example, the training data preprocessing unit may process acquired data into a preset format such that the model training unit 24 can use acquired training data for learning for image recognition.

In addition, the training data selection unit may select data necessary for learning from among training data acquired by the training data acquisition unit 23 and training data preprocessed by the preprocessing unit. The selected training data may be provided to the model training unit 24. For example, the training data selection unit, In addition, the data learning unit 22 may further include a model evaluation unit (not shown) to improve analysis results of the neural network model.

The model evaluation unit may input evaluation data to the neural network model, and when analysis results output from the evaluation data do not satisfy a predetermined criterion, cause the model training unit 22 to re-perform training. In this case, the evaluation data may be predefined data for evaluating the recognition model. For example, the model evaluation unit may evaluate that the predetermined criterion is not satisfied when the number of pieces of or ratio of evaluation data for which analysis results are not accurate among analysis results of the trained recognition model for the evaluation data exceeds a preset threshold.

The communication unit 27 may transmit AI processing results obtained by the AI processor 21 to an external electronic device. For example, external electronic devices may include Bluetooth devices, self-driving vehicles, robots, drones, AR devices, mobile devices, home appliances, and the like.

Although the AI apparatus 20 shown in FIG. 5 is functionally divided into the AI processor 21, the memory 25, the communication unit 27, and the like, the above-described components may be integrated into one module and referred to as an AI module.

FIG. 6 is an exemplary block diagram of an indoor air quality control device using the intelligent air cleaner according to an embodiment of the present invention.

Referring to FIG. 6, the intelligent air cleaner 10 may transmit data requiring AI processing to the AI apparatus 20 through a communication unit, and the AI apparatus 20 including the deep learning model 26 may transmit AI processing results obtained using the deep learning model 26 to the intelligent air cleaner 10. Refer to details described with reference to FIG. 5 for the AI apparatus 20.

Referring to FIG. 6, the intelligent air cleaner 10 according to an embodiment of the present invention may include a sensor unit 115 including one or more sensors for sensing various types of data, the controller 140 for controlling overall operations, and a driving unit 180 that controls operations of an indoor fan, a heat exchanger, a valve, a wind direction adjusting unit, and the like provided inside the main body according to control of the control unit 140.

In addition, the intelligent air cleaner 10 according to an embodiment of the present invention may include a purification unit (not shown) including one or more filters, and the sensor unit 115 may include an air quality sensor that measures indoor air quality during operation.

In this case, the controller 140 may perform control to calculate a filter pollution level based on data measured by the air quality sensor and the driving time during the operation, add the calculated filter pollution level to a pre-stored filter pollution level, and output filter replacement notification information when the filter pollution level satisfies a filter replacement criterion. It is more preferable that the purification unit include a filter unit in which a plurality of filters is stacked. In this case, it is preferable that the filter replacement criterion be set for each filter.

In addition, the intelligent air cleaner 10 according to an embodiment of the present invention may further include one or more of an audio input unit 120 that receives user voice commands, a memory 150 that stores various types of data, a communication unit 170 that wirelessly communicates with other electronic devices, a display 192 that displays predetermined information as an image, and an audio output unit 191 that outputs predetermined information as audio.

The audio input unit 120 may receive an external audio signal and a user voice command. To this end, the audio input unit 120 may include one or more microphones MIC. Further, in order to more accurately receive a user voice command, the audio input unit 120 may include a plurality of microphones 121 and 122. The plurality of microphones 121 and 122 may be spaced apart from each other and disposed at different locations, and may obtain an external audio signal and process it into an electrical signal.

The microphones 121 and 122 may be attached to an inner surface of a center panel assembly 10B and may be placed in contact with or adjacent to a microphone hole.

Although FIG. 5 illustrates an example in which the audio input unit 120 includes two microphones, the first microphone 121 and the second microphone 122, the present invention is not limited thereto.

The audio input unit 120 may include a processing unit that converts analog sound into digital data or may be connected to the processing unit such that a user input voice command can be converted into data that can be recognized by the controller 140 or a predetermined server.

Meanwhile, the audio input unit 120 may use various noise cancellation algorithms to remove noise generated in the process of receiving a user voice command.

In addition, the audio input unit 120 may include components for audio signal processing, such as a filter that removes noise from audio signals received through the microphones 121 and 122 and an amplifier that amplifies and outputs a signal output from the filter.

The memory 150 records various types of information necessary for the operation of the intelligent air cleaner 10 and may include volatile or non-volatile recording media. Recording media store data that can be read by a microprocessor and may include a hard disk drive (HDD), a solid state disk (SSD), a silicon disk drive (SDD), a ROM, a RAM, a CD-ROM, magnetic tapes, floppy disks, optical data storage devices, and the like.

Control data used for operating the air cleaner may be stored in the memory 150.

In addition, the memory 150 may store operation time of the air cleaner, and data necessary for calculation and determination of data, an air pollution level, a filter pollution level, and the like sensed by the sensor unit 115.

Depending on an embodiment, a sound source file of a voice command input by a user may be stored in the memory 150, and the stored sound source file may be transmitted to a voice recognition server system through the communication unit 170. In addition, the stored sound source file may be deleted after the elapse of a preset time or after a preset operation is performed.

Meanwhile, data for voice recognition may be stored in the memory 150, and the controller 140 may process a user voice input signal received through the audio input unit 120 and perform a voice recognition process.

Alternatively, the intelligent air cleaner 10 may include a voice recognition module (not shown), and the voice recognition module may perform simple voice recognition such as call word recognition according to an embodiment.

Further, a call word determination algorithm for determining whether a voice signal includes a call word may be stored in the memory 150.

The controller 140 and the voice recognition module may determine whether the voice signal includes the call word based on the call word determination algorithm.

Meanwhile, simple voice recognition may be performed by the intelligent air cleaner 10, and high-level voice recognition such as natural language processing may be performed by a voice recognition server system.

For example, when a wake-up voice signal including a preset call word is received, the intelligent air cleaner 10 may switch to a state for receiving a voice command. In this case, the intelligent air cleaner 10 may perform only the voice recognition process until operation of checking whether voice including a call word is input, and subsequent voice recognition for user voice input may be performed through the voice recognition server system.

Since the system resources of the intelligent air cleaner 10 are limited, complex natural language recognition and processing may be performed through the voice recognition server system.

Alternatively, determination of whether or not voice including a call word is input may be double-performed by the intelligent air cleaner 10 and the voice recognition server system. Accordingly, misrecognition of call word voice input determination can be reduced and a recognition rate can be improved.

Limited data may be stored in the memory 150. For example, data for recognizing a wake-up voice signal including a preset call word may be stored in the memory 150. In this case, the controller 140 may recognize a wake-up voice signal including a preset call word from a user voice input signal received through the audio input unit 120.

Meanwhile, a call word may be set by the manufacturer. For example, "LG Whissen" may be set as a call word. In addition, settings of s call word may be changed by a user.

The controller 140 may control a user voice command input after recognizing the wake-up voice signal to be transmitted to the voice recognition server system through the communication unit 170.

The communication unit 170 includes one or more communication modules and may perform wireless communication with other electronic devices according to a predetermined communication method to transmit and receive various signals.

Here, the predetermined communication method may be a Wi-Fi communication method. Accordingly, a communication module included in the intelligent air cleaner 10 may be a Wi-Fi communication module, but the present invention is not limited to the communication method.

Alternatively, the intelligent air cleaner 10 may include a different type of communication module or a plurality of communication modules. For example, the intelligent air cleaner 10 may include an NFC module, a Zigbee communication module, a Bluetooth communication module, and the like.

The intelligent air cleaner 10 can be connected to a server included in a voice recognition server system, a predetermined external server, a user's portable terminal, and the like through a Wi-Fi communication module, etc., and can support smart functions such as remote monitoring and remote control.

The user may check information about the intelligent air cleaner 10 or control the intelligent air cleaner 10 through the portable terminal.

In addition, the communication unit 170 may communicate with an access point (AP) device and communicate with other devices by accessing a wireless Internet network through the access point device.

In addition, the controller 140 may transmit state information of the intelligent air cleaner 10, a user voice command, and the like to a voice recognition server system through the communication unit 170.

Meanwhile, when a control signal is received through the communication unit 170, the controller 140 may control the intelligent air cleaner 10 such that the intelligent air cleaner 10 operates according to the received control signal.

The display 192 may display information corresponding to user command input, a processing result corresponding to the user command input, an operation mode, an operation state, an error state, filter replacement information, and the like as images.

According to an embodiment, the display 192 may be configured as a touch screen by forming a mutual layer structure with a touch pad. In this case, the display 192 may also be used as an input device capable of inputting information by a user touch in addition to an output device.

In addition, the audio output unit 191 may output notification messages such as warning sound, an operation mode, an operation state, and an error state, information corresponding to user command input, and a processing result corresponding to the user command input as audio under the control of the controller 140. Meanwhile, the audio output unit 191 may convert an electrical signal from the controller 140 into an audio signal and output the converted audio signal. To this end, the audio output unit 191 may include a speaker or the like.

The controller 140 may control the audio output unit 191 and the display 192 to provide predetermined information to the user through visual/auditory means in each step of a voice recognition process and a process of controlling the intelligent air cleaner 10.

The driving unit 180 controls the amount of air discharged to an indoor space by controlling rotation of a motor connected to the indoor fan. In addition, the driving unit 180 controls the operation of the heat exchanger such that the heat exchanger exchanges heat with the surrounding air by evaporating or condensing a refrigerant supplied thereto.

The driving unit 180 is a device for controlling the direction of air discharged to the indoor space in response to a control command of the controller 140, and changes the direction of the discharged air upward, downward, to the left and to the right when an outlet is opened. The driving unit 180 may include a vane driving unit for driving a vane, a fan driving unit for driving a fan, and the like under the control of the controller 140.

Meanwhile, the driving unit 180 may include a motor driving unit, and may include an inverter or the like to drive the motor.

The intelligent air cleaner 10 may further include an operation unit 130 for user input and a camera 110 capable of imaging a predetermined range around the intelligent air cleaner 10.

The operation unit 130 may include a plurality of operation buttons and transmit an input signal corresponding to a button to the controller 140.

The camera 110 captures images of the surroundings of the intelligent air cleaner 10, the external environment, and the like, and a plurality of cameras may be installed for imaging efficiency.

For example, the camera 110 may include an image sensor (e.g., CMOS image sensor) including at least one optical lens and a plurality of photodiodes (e.g., pixels) forming images by light passing through the optical lens, and a digital signal processor (DSP) that composes an image based on signals output from the photodiodes. The digital signal processor can create not only still images but also moving images composed of frames of still images.

According to an embodiment, it is possible to determine the presence or absence of an occupant and position information based on images obtained through the camera 110.

Meanwhile, an image captured by the camera 110 may be stored in the memory 150.

The intelligent air cleaner 10 according to an embodiment of the present invention may include the sensor unit 115 having one or more sensors.

For example, the sensor unit 115 may include one or more temperature sensors for sensing indoor and outdoor temperatures, a humidity sensor for sensing humidity, an air quality sensor for sensing air quality such as an amount of dust, and the like. Further, the sensor unit 115 may further include a human body detection sensor for sensing the presence or absence of an occupant and/or location of the occupant according to an embodiment.

The sensor unit 115 may sense temperature and humidity data of an indoor environment in which the intelligent air cleaner 10 is installed. In addition, the sensor unit 115 may sense air quality, such as the amount of carbon dioxide and the amount of fine dust, in an indoor environment in which the intelligent air cleaner 10 is installed.

The sensor unit 115 may continuously collect data regarding temperature, humidity, and air quality. Alternatively, the sensor unit 115 may collect data regarding temperature, humidity, and air quality at predetermined time intervals.

In addition, the controller 140 may control the operation of the intelligent air cleaner 10 based on data sensed by the sensor unit 115.

The controller 140 may perform control to calculate a filter pollution level based on data measured by the air quality sensor of the sensor unit 115 and operation time during operation, add the calculated filter pollution level to a pre-stored filter pollution level, and output filter replacement notification information when the filter pollution level satisfies a filter replacement criterion. Simply counting an operation time to determine whether to replace the filter does not reflect the degree of pollution that varies depending on the use environment. Therefore, the filter replacement cycle can be determined more accurately by reflecting both the data measured by the air quality sensor and the operation time to reflect a weighted value according to the air pollution level during driving to the operation time.

In addition, the controller 140 may determine the amount of inflow air based on the air volume during the operation time and the operation time, determine an air pollution level based on data measured by the air quality sensor during the operation, and calculate the filter pollution level based on the amount of inflow air and the air pollution level.

A filter replacement time may be predicted based on a usage time, air volume, and air condition information using an air quality sensor provided to provide indoor air quality information to the user without adding a dedicated device for checking a filter pollution level.

On the other hand, in the prior art, when the pollution level of indoor air exceeds a predetermined reference value regardless of the environment in which an air cleaner is used, the air cleaner is operated regardless of the pollution level of outdoor air, thereby reducing the lifespan of the filter. However, according to one embodiment of the present invention, when the indoor air quality is lower than the outdoor air quality, the lifespan of the filter can be efficiently managed by inducing ventilation rather than operation of the air cleaner.

Meanwhile, the audio output unit 191 may output a voice guidance message for guiding ventilation recommendation information by voice in response to ventilation recommendation of the cloud server 20 under the control of the controller 140. By notifying of ventilation recommendation information through the voice guidance message, it is possible to efficiently manage the air cleaner by reflecting real-time external air pollution.

Meanwhile, the display 192 may display the ventilation recommendation information.

It is possible to determine the presence or absence of a user in a predetermined space and position information of the user based on data obtained by the camera 110 or the sensor unit 115 according to an embodiment. In addition, the controller 140 may determine whether the user is approaching through the camera 110 or the sensor unit 115. In this case, the controller 140 may control the audio output unit 191 and/or the display 192 to output ventilation recommendation information when a user's approach is detected.

According to an embodiment, the controller 140 may control ventilation recommendation information to be transmitted to other electronic devices through the communication unit 170. For example, the intelligent air cleaner 10 may transmit the ventilation recommendation information to a predetermined server, a user's portable terminal, and the like, thereby preventing the user from forcefully continuously driving the intelligent air cleaner 10 with another device and allowing the air cleaner to be efficiently managed through ventilation.

FIG. 7 illustrates a data flow for implementing an indoor air quality control method using an intelligent air cleaner according to an embodiment of the present invention.

Referring to FIG. 7, the indoor air quality control method using an intelligent air cleaner according to an embodiment of the present invention can be implemented through data communication with the intelligent air cleaner 10, a 5G network and a Korea Meteorological Administration (KMA) server. Here, the 5G network may include the cloud server 20 in the present invention. The 5G network is called the cloud server 20 for convenience of description. Further, the air cleaner 10 may refer to the intelligent air cleaner 10 in this specification.

Referring to FIG. 7, the cloud server 20 can transmit a control signal for setting the intelligent air cleaner 10 to an artificial intelligence mode to the air cleaner 10 (S700).

When the air cleaner 10 operates in a normal mode distinguished from the artificial intelligence mode, a ventilation recommendation service provided in an embodiment of the present invention may not be provided. However, only an alarm is provided while the ventilation recommendation service is provided even in the normal mode, and the ventilation recommendation service can be output through an output unit when the alarm is provided and operation of the air cleaner 10 can be continuously performed in the normal mode. However, when the ventilation recommendation service is provided in the artificial intelligence mode, operation of the air cleaner is automatically terminated and an operation of controlling a window to be opened through a window system connected to a home network service can be performed.

When the artificial intelligence mode is set, the intelligent air cleaner 10 can sense dust concentration data through a sensing unit (S710).

In the artificial intelligence mode, the intelligent air cleaner 10 can determine whether dust concentration data sensed for a predetermined time exceeds a reference value (S720). For example, the intelligence air cleaner 10 can store the average of PM 2.5 data for five minutes. When six or more pieces of data are generated on the basis of low air quality, dust data can be transmitted to the cloud server 20 (S730).

The air cleaner 10 can transmit dust concentration data to the cloud server 20 whenever a PM 2.5 fine dust concentration is generated six times on the basis of low air quality according to the aforementioned standard. Here, PM-2.5 (Particulate Matter Less than 2.5 μm) refers to dust with a particle size of 2.5 μm or less. This is referred to as a fine particulate matter. According to results that a smaller particulate size greatly affects health, advanced countries have started introduction of criteria for particulate matters from the late 90s. Korea announced criteria of an annual average of 25 μg/m$^3$ and an average of 35 μg/m$^3$ for twenty-four hours, and the US set criteria of an annual average of 15 μg/m$^3$ and an average of 35 μg/m$^3$ for twenty-four hours. This is called fine particulate matters.

Meanwhile, the cloud server 20 can determine whether ventilation is required with reference to a degree of outside air pollution of a point where the air cleaner 10 is positioned on the basis of dust concentration data collected from the air cleaner 10. To this end, the cloud server 20 can receive outside dust concentrations from the KMA server (30 in FIG. 4) (S740).

The cloud server 20 can compare a degree of indoor air pollution collected from the air cleaner 10 with KMA server data to determine necessity for ventilation (S750).

Further, the cloud server 20 can transmit a ventilation recommendation alarm message to the air cleaner 10. The air cleaner 10 can output the received ventilation recommendation alarm message to a display unit or through an audio output unit. Further, the cloud server 20 may transmit the recommendation alarm message to a user terminal.

FIG. 8 is a flowchart of the indoor air quality control method using an intelligent air cleaner according to an embodiment of the present invention. FIG. 8 illustrates an operation in the cloud server 20 and the operation can be implemented through a processor of the cloud server 20.

Referring to FIG. 8, the processor of the cloud server 20 can receive indoor dust concentration data collected by the air cleaner (S800).

Here, the received dust concentration data may be data that exceeds a predetermined reference value among data sensed at predetermined intervals. As described above, the air cleaner 10 stores sensed dust concentration data and can store an average of PM 2.5 data. Further, the air cleaner 10 can transmit indoor dust concentration data to the cloud server 20 when six or more reference values for high indoor fine dust concentrations are generated on the basis of PM 2.5 data.

The processor can predict indoor dust concentration progress by applying dust concentration data received from the air cleaner to a learning model (S810).

The processor can apply the received dust concentration data as input values of a deep learning model stored in a memory of the cloud server 20. Indoor air quality progress after a time when dust concentration data received from the air cleaner is collected can be predicted through output values of the deep learning model. Here, "indoor dust concentration progress" can refer to indoor air quality changes over time. More specifically, it can refer to a tendency with respect to whether indoor air quality decreases or increases.

The processor can predict the tendency by applying the dust concentration data collected from the air cleaner to an artificial intelligence learning model. The artificial intelligence learning model used to predict the tendency is not limited to the aforementioned deep learning model and the above-described deep learning algorithms such as MLP, CNN and RNN can be applied in various manners.

The processor can receive outside dust concentration data from the KMA server (S820).

The processor can determine whether ventilation is required on the basis of a result value of prediction of indoor dust concentration progress and outside dust concentration data (S830).

For example, the processor can determine that ventilation is not required when it is determined that the predicted indoor dust concentration progress is a pattern of gradual improvement. Further, when the predicted indoor dust concentration progress is determined to be a tendency to degrade, the processor can compare the indoor dust concentration progress with KMA server data. When an indoor dust concentration is higher than an outside dust concentration, further operation of the air cleaner is ended and it can be determined that ventilation is required. However, the indoor dust concentration is lower than the outside dust concentration, it can be determined that ventilation is not required.

The processor can transmit a ventilation alarm message to the air cleaner or the user terminal when there is a necessity for ventilation according to a result of determination of whether ventilation is required (S840).

Hereinafter, an operation of determining necessity for ventilation in the cloud server 20 will be described in more detail with reference to FIG. 9.

FIG. 9 is a diagram for describing a detailed operation of the cloud server for performing the indoor air quality control method using an intelligent air cleaner according to an embodiment of the present invention. In FIG. 9, operation of a 5G network is described as operation of the cloud server, more specifically, the processor of the cloud server.

Referring to FIG. 9, the processor can perform a process of preparing data in order to use indoor dust concentration data received from the air cleaner 10 for AI processing (S900).

As described above, when dust concentrations measured by a sensor of the air cleaner 10 are equal to or greater than a predetermined reference value N time or more continuously, the cloud server 20 receives the data. However, the present invention is not limited thereto and intervals at which dust concentration data is received from the air cleaner may be varied in various manners. Accordingly, it is possible to determine whether dust data concentrations exceed the reference value N times continuously through AI processing (S910).

The processor can apply N pieces of dust data as input values of a DNN model (S920) and predict indoor dust concentration progress through outputs of the DNN model (S930).

If dust concentrations sensed N times continuously for a predetermined time are less than the reference value, the processor can continuously prepare indoor dust concentration data received from the air cleaner without performing AI processing (S910: N).

When a predicted pattern is determined to be a dust concentration increasing pattern (S940: Y), the processor can control interoperation with the KMA system (S950). For example, the processor can request outside dust concentration data from the KMA server. The processor can receive an outside dust concentration from the KMA server in response to the request (S960).

The processor determines that ventilation is required (S980) when an average value of DNN input data is greater than an outside dust concentration (S970).

Hereinafter, standards for learning a deep learning model having dust concentration data received from the air cleaner 10 as input values will be described.

FIG. 10 is a diagram for describing deep learning model learning standards according to an embodiment of the present invention.

Referring to FIG. 10, the air cleaner 10 can collect a large amount of indoor dust concentration data for twenty-four hours, for example. When pattern analysis is required for certain dust concentration data, a pattern in which collected dust concentrations exceed a predetermined reference value needs to be analyzed.

In the graph shown in FIG. 10, section A (1 hour) shows an example in which measured dust concentrations are higher than a reference value in the entire section for 1 hour, and section B (1 hour) shows a pattern in which measured data concentrations are higher than the reference value only for first 30 minutes and lower than the reference value for last 30 minutes. According to a conventional statistical approach for dust concentration data, dust concentration data needs to be collected for one hour and observed in order to predict dust concentration progress in each of section A and section B.

However, when embodiments of the present invention are applied, the deep learning model is learned such that a tendency of dust concentration data for last 30 minutes is predicted on the basis of a pattern of dust concentration data for first 30 minutes in section A. That is, the deep learning model can be learned by setting data for first 30 minutes of section A to input values of the deep learning model and supervising data for last 30 minutes as output values of the deep learning model. Likewise, the deep learning model can be learned by setting data for first 30 minutes of section B to input values of the deep learning model and supervising data for last 30 minutes as output values of the deep learning model.

According to the learned deep learning model, it is possible to predict that indoor dust concentration progress measured for last 30 minutes will be continuously higher than the reference value according to dust concentration data collected for first 30 minutes in the case of section A. Likewise, according to the learned deep learning model, it is possible to predict that indoor dust concentration progress measured for last 30 minutes will be continuously lower than the reference value according to dust concentration data collected for first 30 minutes in the case of section B.

Accordingly, when the indoor air quality control method using an intelligent air cleaner according to an embodiment of the present invention is applied, 50% or more of dust concentration data which is an object of collection and analysis for ventilation recommendation can be reduced. Furthermore, it is possible to secure accuracy equal to or higher than that of dust concentration progress prediction according to a conventional statistical approach while reducing the amount of data required.

FIG. 11 is a diagram for describing various examples of indoor air quality patterns used for deep learning model learning through data clustering according to an embodiment of the present invention. FIG. 12 is a diagram for describing a deep learning model learning patterns through input factors and result factors according to an embodiment of the present invention.

Referring to FIG. 11, there may be an air quality pattern (ventilation non-recommendation) in which fine dust concentrations remain in a high state for a certain time and then become lower. Further, there may be patterns (recommendation of ventilation) in which fine dust concentrations are irregular for time periods or continuously remain in a high state, or a high state and a low state are repeated for a short time. According to an embodiment of the present invention, an AI processor of the cloud server can classify air quality patterns shown in FIG. 11 into a ventilation non-recommendation pattern and a ventilation recommendation pattern.

Referring to FIG. 12, after the aforementioned classification standard is defined, a deep learning model can be learned such that an output of the deep learning model has a "ventilation recommendation" or "ventilation non-recommendation" value for each of a plurality of input factors.

FIG. 12 is a diagram referred to for description of deep learning.

Deep learning, a kind of machine learning, is multi-level learning from a deep level on the basis of data. Deep learning can indicate a set of machine learning algorithms that use multiple layers to extract essential data from a plurality of pieces of data.

A deep learning architecture can include an artificial neural network (ANN) and can be composed of, for example, deep neural network (DNN) such as a convolutional neural network (CNN), a recurrent neural network (RNN) or a deep belief network (DBN).

Referring to FIG. 12, the ANN can include an input layer, a hidden layer and an output layer. Each layer includes a plurality of nodes and is connected to the next layer. Nodes between neighboring layers can be connected to each other having weights.

A computer (machine) discovers a specific pattern from input data applied thereto to form a feature map. The computer (machine) can extract low-level features, intermediate-level features and high-level features to recognize an object and output a recognition result.

The ANN can abstract the next layer as features of a higher level.

Referring to FIG. 12, each node can operate on the basis of an activation model, and an output value corresponding to an input value can be determined according to the activation model.

An arbitrary node, for example, an output value of a low-level feature, can be input to the next layer connected to the corresponding node, for example, a node of an intermediate-level feature. A node of the next layer, for example, a node of an intermediate-level feature, can receive values output from a plurality of nodes of low-level features.

Here, an input value of each node may be a value obtained by applying a weight to an output value of a node of a previous layer. A weight can refer to strength of connection between nodes.

Further, deep learning may be regarded as a process of discovering an appropriate weight.

Further, an arbitrary node, for example, an output value of an intermediate-level feature, can be input to the next layer connected to the corresponding node, for example, a node of a high-level feature. A node of the next layer, for example, a node of a high-level feature, can receive values output from a plurality of nodes of intermediate-level features.

An ANN can extract feature information corresponding to each level using a learned layer corresponding to each level.

The ANN can perform sequential abstraction to recognize a predetermined object using feature information of the highest level.

For example, in a face recognition process using deep learning, a computer can distinguish bright pixels and dark pixels from an input image according to pixel brightness, detect simple forms such as outlines and edges and then detect more complicated forms and objects. Finally, the computer can detect a form that defines a human face.

A deep learning architecture according to the present invention can use various known architectures. For example, the deep learning architecture according to the present invention may be a convolutional neural network (CNN), a recurrent neural network (RNN), a deep belief network (DBN) or the like.

The RNN is mainly used for natural language processing, is an architecture effective for processing time-series data varying over time, and can accumulate layers every moment to constitute an artificial neural network architecture. The DBN is a deep learning architecture configured by accumulating a restricted Boltzman machine (RBM) that is a deep learning technique in multiple layers. When RBM learning is repeated to achieve a predetermined number of layers, a DNB having the corresponding number of layers can be formed. The CNN is a model simulating the human brain function, which is generated on the assumption that a person extracts basic features of an object and then recognizes the object on the basis of results of complicated calculations in the brain when the person recognizes the object.

Meanwhile, learning of an artificial neural network can be performed by adjusting a weight of a connection line between nodes such that a desired output is obtained for a given input (adjusting a bias if required). Further, an artificial neural network can continuously update weight values through learning. In addition, a method such as back propagation may be used for learning of an artificial neural network.

Furthermore, the AI apparatus may store weights and biases constituting the DNN architecture according to an embodiment. Further, weights and biases constituting the DNN may be stored in an embedded memory of a pattern recognition module.

Referring to FIG. 12, the AI processor in the cloud server can update weight values applied to the deep learning model such that a specific output (ventilation recommendation or ventilation non-recommendation) is output on the basis of input factors shown in FIG. 12.

Further, referring to FIG. 12, when input factors (e.g., D1 to D6) are input to a trained deep learning model, a ventilation recommendation or ventilation non-recommendation result value may be derived.

As an example of an input factor, D1 may be an average value of dust concentration data for 1 to 5 minutes. D2 may be an average value of dust concentration data for 6 to 10 minutes on the basis of PM 2.5. D3 to D6 can be defined in the same manner. Although the aforementioned input factors have been described as examples, similar result values can be output within a similar reliability range through dust concentration pattern prediction of a learned deep learning model even though any input factor is applied to the learned deep learning model.

FIG. 13 is a diagram for describing an example of determining necessity for ventilation using a learned deep learning model according to an embodiment of the present invention.

Referring to FIG. 13, the AI processor of the cloud server 20 can set indoor dust concentration data received from the air cleaner 10 as input values of a deep learning model. The input values may be PM 2.5 average values every five minutes and may have different dust concentration average values.

Referring to FIGS. 12 and 13, the AI processor of the cloud server 20 can assign a first weight Weight_1 to data input to an input layer, add a first bias bias_1 thereto and transfer the resultant value to a first hidden layer (S1310).

The AI processor can assign a second weight Weight_2 to data input to the first hidden layer, add a second bias bias_2 thereto and transfer the resultant value to a second hidden layer (S1320). Learning operations (S1330, S1340 and S1350) in the same pattern can be performed on the remaining third and fourth hidden layers. A series of processes of outputting a value from an input layer to an output layer through hidden layers in the deep learning model can be realized by a separate processor or a separate program which controls the deep learning model.

The number of hidden layers and the number of outputs of each hidden layer may depend on a deep learning network architecture. According to an embodiment of the present invention, if the first hidden layer is defined as 20 unit, the second hidden layer is defined as 16 unit, the third hidden layer is defined as 10 unit, and the fourth hidden layer is defined as 4 unit, the last output layer is 1 unit and can be configured to have an output value of "1" when ventilation is required and an output value of "0" when ventilation is not required.

FIGS. 14 and 15 are diagrams for describing results of tests to which the indoor air quality control method using an intelligent air cleaner according to an embodiment of the present invention is applied.

FIG. 14 illustrates results of a first test of recommending ventilation for 50 minutes on the basis of data collected by the air cleaner for 30 minutes. As a result of the first test, when the test is performed after a DNN model is trained such that ventilation recommendation is performed 2979 times and ventilation non-recommendation is performed 2089 times, accuracy of 78.4% can be achieved. As a result of a second test of recommending ventilation for 60 minutes on the basis of data collected for 30 minutes, a DNN model with accuracy of 71.3% can be implemented.

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. An indoor air quality control method using an air cleaner configured to acquire indoor dust concentration data and a cloud server configured to receive the indoor dust concentration data from the air cleaner, comprising:
   receiving, from the air cleaner, dust concentration data of an indoor place where the air cleaner is located;

predicting indoor dust concentration progress on the basis of output values of a learning model having the received indoor dust concentration data as input values;

receiving outside dust concentration data from an external server;

determining whether ventilation is required by comparing the predicted indoor dust concentration progress with the outside dust concentration data; and controlling an alarm to be output to the air cleaner or a mobile terminal associated with the air cleaner according to whether ventilation is required, wherein the received indoor dust concentration data is data exceeding a predetermined reference value among data sensed at predetermined intervals.

2. The indoor air quality control method of claim 1, wherein the receiving of the indoor dust concentration data from the air cleaner comprises receiving a certain percentage or higher of data in a bad state on the basis of particulate matter less than 2.5 μm forecast from among the received indoor dust concentration data sensed by the air cleaner at predetermined intervals.

3. The indoor air quality control method of claim 1, wherein the predicting of the indoor dust concentration progress comprises:

determining whether the received indoor dust concentration data continuously sensed N-th times exceeds the predetermined reference value; and defining data of N dust concentrations as input values of a deep learning model and predicting the indoor dust concentration progress through output values of the deep learning model.

4. The indoor air quality control method of claim 3, further comprising, when progress of additional N dust concentrations sensed after the N dust concentrations are sensed is predicted to increase as a result of prediction of the indoor dust concentration progress:

requesting the outside dust concentration data from a meteorological administration server; and determining that ventilation is required when an average value of input data of the deep learning model is greater than the outside dust concentration data received from the meteorological administration server.

5. The indoor air quality control method of claim 1, wherein the indoor dust concentration progress is predicted as one of a pattern in which the same number of dust concentrations as the number of pieces of the received indoor dust concentration data received from the air cleaner increase, a pattern in which the dust concentrations decrease and a pattern in which the dust concentrations remains in a current state.

6. The indoor air quality control method of claim 5, wherein the determining of whether ventilation is required comprises determining that ventilation is required when the indoor dust concentration progress is determined to be the increasing pattern or the current state remaining pattern.

7. The indoor air quality control method of claim 5, wherein the determining of whether ventilation is required comprises:

determining that ventilation is not required when the indoor dust concentration progress is predicted as the increasing pattern and an outside dust concentration received from the external server is higher than the indoor dust concentration; and controlling the air cleaner to continuously operate.

8. The indoor air quality control method of claim 5, wherein the determining of whether ventilation is required further comprises predicting a ventilation time, wherein it is determined that ventilation is required when the indoor dust concentration progress is predicted as the decreasing pattern and it is predicted that the outside dust concentration is lower than the indoor dust concentration at a specific time of the decreasing pattern.

9. The indoor air quality control method of claim 1, wherein the controlling of output of the alarm comprises controlling an indoor dust concentration state and whether ventilation is required to be output through audio.

10. The indoor air quality control method of claim 1, wherein the receiving of the indoor dust concentration data further comprises receiving, in a state in which the air cleaner is powered off, the indoor dust concentration data sensed through a sensor in a state in which the air cleaner is in a standby state, further comprising activating the air cleaner when it is determined that ventilation is required.

11. The indoor air quality control method of claim 1, wherein the determining of whether ventilation is required comprises adaptively controlling a ventilation recommendation standard in consideration of characteristics of an occupant residing in the indoor place.

12. An indoor air quality control apparatus using an air cleaner configured to acquire indoor dust concentration data and a cloud server configured to receive the indoor dust concentration data from the air cleaner, the cloud server comprising:

a radio frequency (RF) communication module;

a memory configured to store a deep learning model; and a processor configured to determine whether to perform ventilation in a space in which the air cleaner is located on the basis of indoor dust concentration data received from the air cleaner and outside dust concentration data received from a meteorological administration server, wherein the received indoor dust concentration data is data exceeding a predetermined reference value among data sensed at predetermined intervals, and wherein the processor is configured to predict indoor dust concentration progress on the basis of output values of the deep learning model having the received indoor dust concentration data as input values and is configured to control an alarm to be output to the air cleaner or a mobile terminal associated with the air cleaner according to whether ventilation is required.

13. The indoor air quality control apparatus of claim 12, wherein the processor is configured to determine whether the received indoor dust concentration data continuously sensed N-th times exceeds the predetermined reference value, is configured to define data of N dust concentrations as input values of the deep learning model and is configured to predict the indoor dust concentration progress through output values of the deep learning model.

14. The indoor air quality control apparatus of claim 12, wherein, when progress of additional N dust concentrations sensed after the N dust concentrations are sensed is predicted to increase as a result of prediction of the indoor dust concentration progress, the processor is configured to request the outside dust concentration data from the meteorological administration server and is configured to determine that ventilation is required when an average value of input data of the deep learning model is greater than the outside dust concentration data received from the meteorological administration server.

15. An indoor air quality control system, comprising:

an air cleaner configured to acquire indoor dust concentration data; and a cloud server configured to receive the indoor dust concentration data from the air cleaner, wherein the received dust concentration data is data exceeding a predetermined reference value among data sensed by the air cleaner at predetermined intervals, and wherein the cloud server is configured to:
- predict indoor dust concentration progress on the basis of output values of a deep learning model having the received indoor dust concentration data as input values,
- receive outside dust concentration data from an external server,
- determine whether ventilation is required by comparing the predicted indoor dust concentration progress with the outside dust concentration data, and
- output an alarm to the air cleaner or a mobile terminal associated with the air cleaner according to whether ventilation is required.

16. A non-transitory computer-readable medium storing a computer-executable component configured to be executed in one or more processors of a computer device, the computer-executable component being configured:
- to receive, from an air cleaner, dust concentration data of an indoor place where the air cleaner is located;
- to predict indoor dust concentration progress on the basis of output values of a learning model having the received indoor dust concentration data as input values;
- to receive outside dust concentration data from an external server;
- to determine whether ventilation is required by comparing the predicted indoor dust concentration progress with the outside dust concentration data; and
- to control an alarm to be output to the air cleaner or a mobile terminal associated with the air cleaner according to whether ventilation is required, wherein the received indoor dust concentration data includes data exceeding a predetermined reference value among data sensed at predetermined intervals.

* * * * *